United States Patent Office 2,885,439
Patented May 5, 1959

2,885,439

PREPARATION OF SUBSTITUTED AMINES

Ferdinand B. Zienty, Brentwood, Mo., assignor to Monsanto Chemical Company, St. Louis, Mo., a corporation of Delaware No Drawing. Application October 11, 1950
Serial No. 189,667

15 Claims. (Cl. 260—563)

This invention relates to the manufacture of cycloalkyl aminopropanes and more particularly to the manufacture of cyclopentyl, cyclohexyl, and cycloheptyl aminopropanes.

It is an object of this invention to provide a new process for preparing cycloalkyl aminopropanes. A particular object of this invention is to provide a method for producing cyclopentyl, cyclohexyl, and cycloheptyl-aminopropanes from the appropriate cycloalkenyl acetones.

According to the present invention cycloalkyl aminopropanes in which the cycloalkyl group is a cyclopentyl, a cyclohexyl, or a cycloheptyl group are prepared by reacting a cyclopentyl, a cyclohexenyl or a cycloheptenyl acetone with ammonia and hydrogen in the presence of a hydrogenation catalyst.

According to a preferred embodiment of the invention a cyclopentyl, a cyclohexenyl, or a cycloheptenyl acetone is reacted with a mixture of ammonia and hydrogen in the presence of a nickel-containing hydrogenation catalyst to form the corresponding 1-cycloalkyl-2-aminopropane.

The following examples are illustrative of the present invention but are not to be construed as limitative thereof. Where parts are mentioned, they are parts by weight.

Example I

To 124 parts of cyclopentyl acetone are added 125 parts of methanol and 4.2 parts of a nickel base hydrogenation catalyst (approximately 70% nickel) and the mixture is placed in an autoclave equipped with an agitator. The air is removed by evacuation to 15–20 inches of mercury (gage). 20.4 parts of anhydrous ammonia gas are then introduced with stirring. While continuing the stirring, hydrogen pressure of 900 pounds per square inch is applied to the autoclave and the temperature gradually increased until a maximum of 150° C. is reached. Reaction under these conditions is continued until absorption of hydrogen ceases. The resulting reaction product is cooled, removed from the autoclave and filtered. The methanol is removed by distillation and a high yield of 1-cyclopentyl-2-aminopropane is recovered by fractional distillation.

Example II

A mixture of 138 parts cyclohexenyl acetone and 4.6 parts of the nickel catalyst employed in Example I is charged to an autoclave. After evacuation as in Example I, 20.4 parts of anhydrous ammonia gas are added and the hydrogenation carried out as in Example I. The resulting reaction product is cooled, removed from the autoclave and fractionally distilled. An excellent yield of 1-cyclohexyl-2-aminopropane is recovered from the mixture.

Example III

A mixture of 76.6 parts of cycloheptenyl acetone, 75 parts of ethanol, and 10 parts of ammonia are hydrogenated over 5 parts of copper chromite catalyst as in Example I except that the temperature is increased to 200° C. maximum. The resulting product is cooled, removed from the autoclave and filtered. The ethanol is removed by distillation and 1-cycloheptyl-2-aminopropane is recovered in excellent yield by fractional distillation.

Example IV

A mixture of 114.9 parts of cycloheptenyl acetone, 112.5 parts of ethanol and 15 parts of ammonia are hydrogenated over 6 parts of the nickel base hydrogenation catalyst employed in Example I at a temperature of 150° C. and a pressure of 950 pounds per square inch. The resulting reaction product is cooled, removed from the autoclave and filtered. The ethanol is recovered by distillation and a good yield of 1-cycloheptyl-2-aminopropane is obtained by fractional distillation.

Example V

A charge of 250 parts of cyclopentenyl acetone, 42 parts of ammonia and 8.5 parts of the nickel base catalyst employed in Example I is placed in an autoclave. Hydrogenation under a pressure of 900 pounds per square inch is carried out as in Example I. The resulting reaction product is cooled, removed from the autoclave and filtered. After fractional distillation an excellent yield of 1-cyclopentyl-2-aminopropane is obtained.

Numerous variations may be introduced into the process of the invention as exemplified by the specific examples. Thus, the reaction between the cycloalkenyl acetone, ammonia and hydrogen is preferably carried out in the presence of a solvent which is preferably an alkanol, such as methyl, ethyl, propyl, butyl alcohol and the like. However, if desired, the hydrogenation may be carried out in other solvents, such as toluene, benzene, etc., or in the absence of a solvent.

The cycloalkenyl acetones used in the process of this invention may be unsubstituted or may be substituted, e.g., by one or more of such radicals as amino, nitro, halogen, e.g. chlorine, hydroxyl, alkyl, e.g. methyl, ethyl, propyl, etc., alkenyl, aryl, and cycloalkyl radicals thereby forming correspondingly substituted cycloalkyl aminopropanes.

In carrying out the process in accordance with this invention, any of the well known hydrogenation catalysts may be employed. For example, there may be employed active metallic nickel, nickel oxide, platinum, platinum oxide, etc., or mixtures of the same or there may be employed copper chromite, nickel chromite and the like hydrogenation catalysts.

A preferred class of catalysts comprises those made up of or containing nickel.

The amount of catalyst may be substantially varied, but, particularly in the case of nickel catalysts containing at least 70% nickel, is preferably between 2.5% and 5% based on the weight of the cycloalkenyl acetone and ammonia. The catalysts may be unsupported or may be supported on any inert carrier such as for example, charcoal, kieselguhr, asbestos, fuller's earth, Filter-Cel, bentonite, vermiculite, monox, silica, and the like. A preferred carrier is activated charcoal.

The ratio of ammonia to cycloalkenyl acetone used in the process of the invention may vary considerably. However, a slight molar excess of the ammonia is preferred, e.g., 1.2 to 1.5 moles of ammonia are used for each mole of cycloalkenyl acetone.

Hydrogen pressures of 500 to 1000 pounds per square inch are preferable but other pressure may be used if so desired, e.g. 50–3000 pounds per square inch and higher may be employed if desired, the construction of the equipment being the limiting factor in the upper pressures.

The temperature at which the reaction is carried out may be substantially varied, e.g., from 50° C. to 300° C. but preferably temperatures within the range of 100° to 150° C. are employed, particularly when nickel catalysts are used.

The compounds prepared according to this invention are valuable vasoconstrictors or agents that increase arterial pressure by the constriction of the blood vessels. They are also useful as intermediates in the preparation of organic compounds.

It is understood that the above description is given by way of illustration only, and not of limitation, and that deviations are possible within the spirit of the invention.

What is claimed is:

1. A process for preparing cycloalkyl aminopropanes which comprises reacting a mixture of a cycloalkenyl acetone selected from the group consisting of a cyclopentenyl acetone, a cyclohexenyl acetone and a cycloheptenyl acetone, and ammonia in the presence of hydrogen and a hydrogenation catalyst.

2. A process for preparing cycloalkyl aminopropanes which comprises heating under pressure a mixture of a cycloalkenyl acetone selected from the group consisting of a cyclopentenyl acetone, a cyclohexenyl acetone and a cycloheptenyl acetone, hydrogen and ammonia in the presence of a solvent and a hydrogenation catalyst.

3. A process for preparing cycloalkyl aminopropanes which comprises heating under pressure a mixture of hydrogen, a cycloalkenyl acetone selected from the group consisting of a cyclopentenyl acetone, a cyclohexenyl acetone and a cycloheptenyl acetone, and ammonia in the presence of an alkyl alcohol containing from 1–4 carbon atoms and a hydrogenation catalyst.

4. A process for preparing cycloalkyl aminopropanes which comprises heating under pressure a mixture of hydrogen, a cycloalkenyl acetone selected from the group consisting of a cyclopentenyl acetone, a cyclohexenyl acetone and a cycloheptenyl acetone, and ammonia in the presence of an alkyl alcohol containing from 1–4 carbon atoms and a nickel hydrogenation catalyst.

5. A process for preparing cyclopentyl aminopropane which comprises heating under hydrogen pressure a mixture of cyclopentenyl acetone and ammonia and a hydrogenation catalyst.

6. A process for preparing cyclopentyl aminopropane which comprises heating under hydrogen pressure a mixture of cyclopentenyl acetone and ammonia in the presence of a solvent and a hydrogenation catalyst.

7. A process for preparing cyclopentyl aminopropane which comprises heating under hydrogen pressure a mixture of cyclopentenyl acetone and ammonia in the presence of an alkyl alcohol containing 1–4 carbon atoms and a hydrogenation catalyst.

8. A process for preparing cyclopentyl aminopropane which comprises heating under hydrogen pressure a mixture of cyclopentenyl acetone and ammonia in the presence of methanol and a nickel hydrogenation catalyst.

9. A process for preparing cyclohexyl aminopropane which comprises heating under hydrogen pressure a mixture of cyclohexenyl acetone and ammonia and a hydrogenation catalyst.

10. A process for preparing cyclohexyl aminopropane which comprises heating under hydrogen pressure a mixture of cyclohexenyl acetone and ammonia in the presence of a solvent and a hydrogenation catalyst.

11. A process for preparing cyclohexyl aminopropane which comprises heating under hydrogen pressure a mixture of cyclohexenyl acetone and ammonia in the presence of an alkyl alcohol containing 1–4 carbon atoms and a hydrogenation catalyst.

12. A process for preparing cyclohexyl aminopropane which comprises heating under hydrogen pressure a mixture of cyclohexenyl acetone and ammonia in the presence of methanol and a hydrogenation catalyst containing nickel.

13. A process for preparing cycloheptyl aminopropane which comprises heating under hydrogen pressure a mixture of cycloheptenyl acetone and ammonia and a hydrogenation catalyst.

14. A process for preparing cycloheptyl aminopropane which comprises heating under hydrogen pressure a mixture of cycloheptenyl acetone and ammonia in the presence of an alkyl alcohol containing from 1–4 carbon atoms and a hydrogenation catalyst.

15. A process for preparing cycloheptyl aminopropane which comprises heating under hydrogen pressure a mixture of cycloheptenyl acetone and ammonia in the presence of methanol and a hydrogenation catalyst containing nickel.

References Cited in the file of this patent

UNITED STATES PATENTS

| | | |
|---|---|---|
| 2,045,574 | Adkins | June 30, 1936 |
| 2,483,381 | Goldberg et al. | Sept. 27, 1949 |
| 2,520,015 | Rohrman | Aug. 22, 1950 |

FOREIGN PATENTS

| | | |
|---|---|---|
| 265,960 | Great Britain | Mar. 1, 1928 |

OTHER REFERENCES

Ellis: "Hydrogenation of Organic Substances" (1930), pages 222, 225, 245, 246.

Stevenson: "Ind. and Eng. Chem.," vol. 40, No. 9 (1948), pages 1585–86.